United States Patent [19]

Nowicki et al.

[11] 4,379,525
[45] Apr. 12, 1983

[54] PROCESS FOR RECYCLING PLASTIC CONTAINER SCRAP

[75] Inventors: Casimir W. Nowicki, Sylvania; Alan M. Jaffee, Toledo, both of Ohio

[73] Assignee: Owens-Illinois, Inc., Toledo, Ohio

[21] Appl. No.: 290,643

[22] Filed: Aug. 6, 1981

[51] Int. Cl.³ .............................................. B02C 19/14
[52] U.S. Cl. .......................................... 241/20; 241/3; 241/24; 241/99; 241/101 B; 264/37; 366/98
[58] Field of Search ....................... 366/96, 97, 98, 99; 156/153; 264/140, 36, 37, 536, DIG. 69; 260/23; 241/14, DIG. 38, 20, 24, 99, 101 B, 3, 101.4, 21

[56] References Cited

U.S. PATENT DOCUMENTS

| | | | |
|---|---|---|---|
| 3,516,841 | 6/1970 | Haveman | 241/14 X |
| 3,833,178 | 9/1974 | Beck | 241/3 |
| 4,000,031 | 12/1976 | Acobas | 241/14 X |
| 4,033,804 | 7/1977 | Baldtga | 264/37 X |

FOREIGN PATENT DOCUMENTS 2413130 8/1979 France ................................ 241/14

Primary Examiner—Mark Rosenbaum
Attorney, Agent, or Firm—Thomas L. Farquer; M. E. Click; D. H. Wilson

[57] ABSTRACT

A batch process for recycling plastic container scrap is disclosed comprising the steps of reducing a container bearing an externally disposed label to granules, agitating the granules in hot water to remove the label material portion from the plastic portion, separating the hot water and label portion from the plastic granules, filtering and recycling the hot water into the batch while separating the waste label residue, remixing and reagitating until substantially all of the waste label residue is removed. Subsequently, the plastic granules are floated over a weir and collected in a dewatering station with the hot wash water recycled into a hot water reservoir. A major portion of the wash water is removed from the granules in the dewatering station. Substantially all of the residual wash water is removed in a drying station.

15 Claims, 3 Drawing Figures

PROCESS FOR RECYCLING PLASTIC CONTAINER SCRAP

TECHNICAL FIELD

The present invention relates to a process for the recovery of clean plastic granules from defective in-mold labeled organic thermoplastic containers.

BACKGROUND ART

The present invention relates to a salvage and recycling of thermoplastic, organic materials from hollow containers. Typically, hollow thermoplastic containers are used to contain a variety of fluids, such as, for example, carbonated beverages, various food products, motor oils and lubricants and the like. In many cases, the containers bear externally-disposed paper or metal foil labels which identify the product content of the container.

One method to fabricate such containers from organic thermoplastic materials involves the blow molding of so-called parisons or performs at an elevated temperature into the shape of the final container. One method of blow molding containers involves the placement of paper labels on the inside of the blow mold sections. As the heated preform is expanded into the final container shape, it contracts and adheres to the paper label disposed on the internal surface of a mold section. This process, known as in-mold labeling, provides a labeled container in a simplified process compared to more conventional methods of container formation wherein labels are applied after the bottle has been blow molded.

When containers are formed with the label attached thereto inside the mold, the containers are not subject to structural defect inspection prior to labeling. Accordingly, when in-mold labeled containers bear a surface defect, bubble, crack or similar defect which effects the container, there is no opportunity to collect plastic containers without labels for recycling. Typically, unlabeled blow molded containers can be inspected immediately following the blow molding step and defective containers may be reground into granular scrap. Such granular scrap can be reprocessed into new containers.

In-mold label containers which are defective may be recycled into new containers by practicing the process of the present invention.

In the past, many methods for recycling plastics have been disclosed.

For example, U.S. Pat. No. 4,073,661 discloses a continuous process for cleaning soiled plastic material wherein the soiled plastic material is washed in a zone of high turbulence, transferred to a turbulence-free zone, and is thereafter forced under a submerged edge and separated thereby from the impurity which contaminated it initially.

U.S. Pat. No. 3,843,060 discloses a cyclone-type particle separator device which operates to separate a mixture of thermoplastic resin and an associated fabric backing material. The plastic material is granulated and fed into a first separation phase. In the first separation phase, most of the lint and fly is separated from the mixture. The mixture is then fed into a specific gravity air separator which effects a further separation of fiber material from plastic granular material.

U.S. Pat. No. 3,387,793 discloses a method to separate rubber chunks from imbedded foreign objects therein. The chunks of rubber are shredded, subsequently fed into a washing liquid which releases foreign particles from the rubber. The rubber floats to the surface of the washing solution, is collected, and pressed together under ever-increasing pressures to remove a high percentage of the liquid therefrom.

U.S. Pat. No. 2,879,005 discloses a process to recycle scrap plastic wherein the scrap plastic is chopped into small pieces, the small pieces are frozen to enbrittle the plastic, and thereafter subjected to highspeed pulverization to free the impurities from the interior portions of the plastic. Subsequently, the plastic and impurities are separated.

U.S. Pat. No. 4,000,031 describes a process to recover cellulosic fibers and plastic materials from plastic-coated paper and wood. The material is wet-pulped in a water suspension and subsequently discharged into a dilution tank. In the dilution tank, some plastic floats free to the surface and is recovered mechanically. The fiber suspension is screened in a rotating screen-type separator to recover fiberous portions of the mixture.

U.S. Pat. No. 4,034,033 discloses a process to recover material from the center portions of labeled phonograph records. The method to recycle the labeled center portions of the record includes the steps of removing the paper labels from the center of the record disk by immersing that portion of the disk in an aromatic hydrocarbon solution to remove the label. Subsequently, the center portion of the disk is crushed, briquetted with virgin plastic, to achieve a proper regrind proportion, and thermally conditioned to achieve uniform mixing of the regrind and virgin material fractions.

U.S. Pat. No. 4,033,804 describes a method to reclaim thermoplastic material from molecularly-oriented containers by warming the containers so that they shrink a sufficient amount to cause separation of the label from the container.

U.S. Pat. No. 4,067,826 discloses a process for recovering mixed plastic material by a ballistic separation method.

DISCLOSURE OF INVENTION

The present invention concerns a process to recover recyclable thermoplastic, organic material from in-mold labeled containers in a batch process using recyclable separation fluids. The process comprises the steps of reducing a (paper) labeled container to granular form, placing the granular scrap plastic in a mixing tank with hot wash water and agitating the mixture vigorously to separate a portion of the (paper) label residue from the granular plastic. The wash water and (paper) label residue portion are separated from the plastic granules by draining from the mixing tank. The wash water and (paper) label residue portion is filtered to separate the (paper) label residue from the hot wash water. The hot wash water is recycled into the mixing tank for subsequent agitation steps to remove further portions of the (paper) label residue from the granular plastic. Additional agitation and water recycling steps are used until sufficient (paper) label residue has been removed to allow the granular plastic to be used in a regrind-virgin plastic mixture. Subsequently, the mixing tank is overflowed by the addition of excess hot recycled wash water so that the plastic granules overflow a weir and are collected in a dewatering tank. The dewatering tank separates the cleansed, plastic granules from the major portion of hot wash water, which is recycled to a hot wash water reservoir for use with the next batch. The moist granules are transferred from the dewatering tank to drying means where residual hot wash water is removed before the granules are mixed with virgin resin to form new feedstock. The present process overcomes the limitations of the prior art by providing for the purification and collection of recyclable plastic scrap using only hot wash water, without resorting to the expedient of freezing the plastic granules, complex air cycling separation techniques and/or equally complex ballistic separation methodology. Also, the process does not require, in most cases, expensive volatile organic solvents for operation.

BEST MODE OF CARRYING OUT THE INVENTION AND PREFERRED EMBODIMENT

Figure 1:
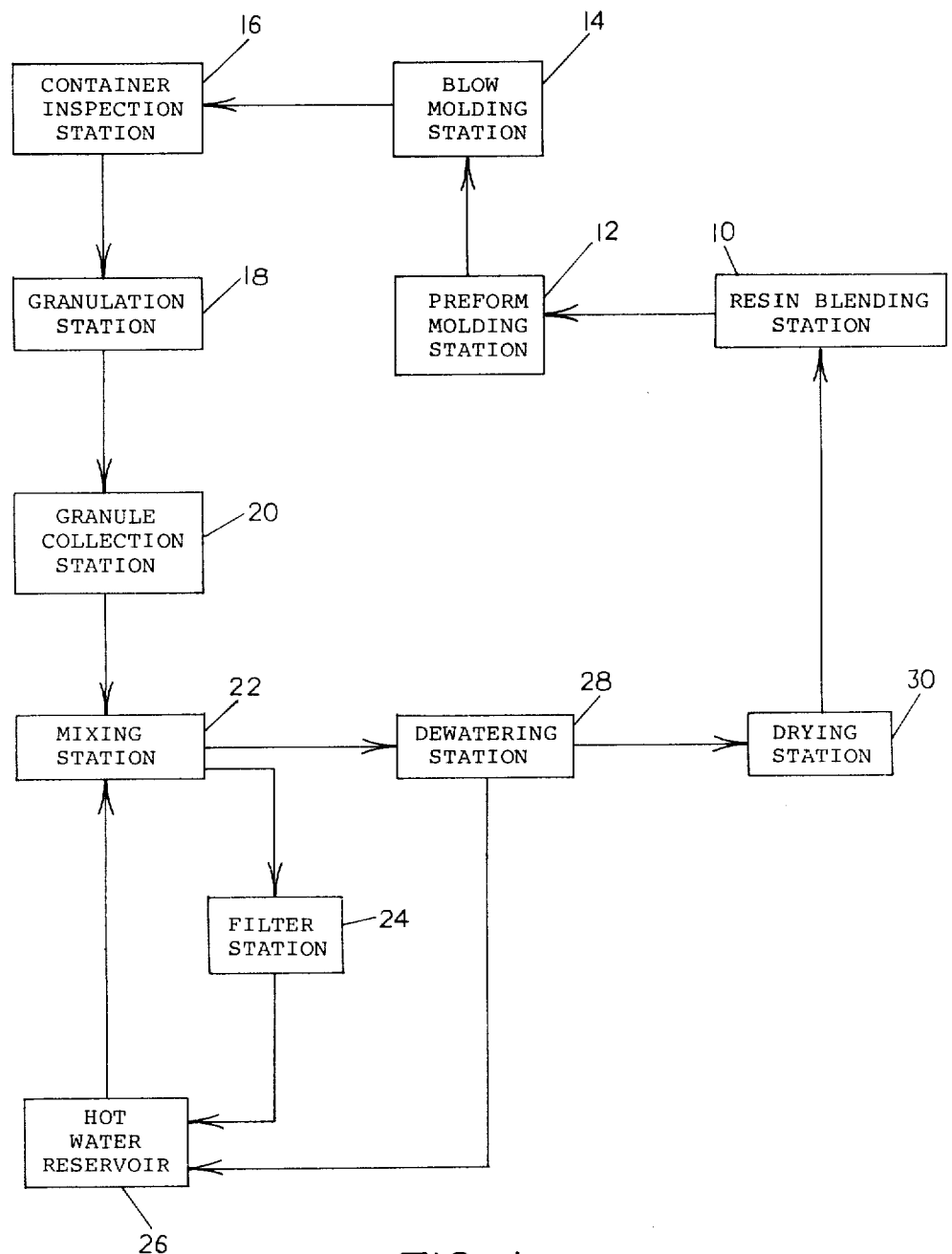
FIG. 1 illustrates a flow diagram according to the process of the present invention for recycling plastic containers.

The present process for recycling organic thermoplastic containers bearing paper, metal foil or other labels into useful plastic granules for fabricating new plastic containers is used in conjunction with generally conventional container fabrication technology. The exception to the conventional fabrication technology resides in the application of a label to the container in a blow mold. Referring to the drawings at FIG. 1, there is illustrated a flow diagram of the present invention in conjunction with the process steps in plastic container fabrication operations.

In a plastic container fabricating plant a resin blending station 10 is loaded with virgin material as well as an appropriate fraction of regrind or recycled material. The material is typically converted from a dry solid state to a molten, flowable state at the resin blending station 10. The blending station 10 accepts and mixes together virgin and recycled plastic granules which material is then used to make container preforms. From the resin blending station 10 the molten material is usually fed to a preform molding station 12. The preform molding station 12 is typically an injection molding machine or like device capable of accepting molten plastic and forming it into parisons or preforms. The preforms may be either transferred in the hot, yet solid, state to a blow molding station 14, or may be cooled and stored for later use. The blow molding station 14 operates to expand, under air pressure, the hot preform molding station 12 into the shape of the final desired container. Typically the preforms are placed in bipartate mold sections and expanded by internal pressurization with air.

In some blow molding operations, paper, metal foil or other labels are disposed upon the interior surfaces of the container blow molds such that when the hot expanding plastic of the container preform contacts the label, the label adheres to the hot plastic and affixes itself thereto. Accordingly, the containers exiting a blow molding station 14 from such an in-mold labeling operation already bear labels on their external surfaces. Typically, small amounts of a wax containing adhesive are disposed upon the inner surface of the labels so that they adhere to the exterior of the containers securely.

In prior practice, containers were blow molded at a station like the blow molding station 14, but without in-mold label application. Such containers could be inspected and rejected for defects prior to labeling. The present process is adapted for use with an in-mold labeling blow molding operation, wherein labeled containers are generated directly from a blow molding station.

In-mold labeled containers generated in blow molding station 14 are conveyed to a container inspection station 16. At container inspection station 16, conventional container inspection methods are applied to the containers and defective containers are selected for recycling. The defective containers are conveyed from container inspection station 16 to a granulation station 18. At the granulation station 18, the containers are reduced to granules of scrap plastic contaminated with paper label residue, or in other cases metal foil label residue. For purposes of the present process paper and foil residue are equivalent and paper label material only will be discussed. In many cases, the paper labels also bear wax containing adhesives which was used to adhere them to the external surface of the container, which will also be removed from the granular plastic by the present process. The granules are typically less than one-half inch in their longest dimension or less.

The granule collection station 20 accepts the scrap plastic granules from granulation station 18 and stores them until sufficient weight has been accumulated to allow for introduction into the batch recycling system, described hereinafter.

The batch recycling system includes mixing station 22, filter station 24, hot water reservior 26, dewatering station 28, and drying station 30.

As a sufficient weight of scrap plastic granules contaminated with paper and adhesive are collected in granule collection station 20, they are discharged into mixing station 22. In mixing station 22, the granules are mixed with heated water from hot water reservior 26 in sufficient fraction to allow for the agitation of the plastic granules to remove a portion of the paper and adhesive affixed to the plastic granules. Typically, the agitation at mixing station 22 is accomplished by a high speed propeller, described in detail hereinafter. The mixture of hot water and plastic granules is agitated for a sufficient time to remove a major fraction of the paper and adhesive from the plastic granules contained in the mixing station 22. When sufficient agitation has occurred, the agitation is stopped and a settling period is taken to allow the buoyant plastic granules to rise to the surface of the mixing station 22, and the heavier paper residue from the container labels to settle to the bottom of the mixing tank. The adhesive portion of the scrap dissolves in, or forms an emulsion with, the hot wash water.

Pre-process can operate with any plastic and label material so long as the plastic is buoyant in the wash water and the label residue is not.

After some time for settling of the nonbuoyant label material has elasped, a portion of the hot water and the settled paper residue is conveyed to filter station 24. At filter station 24 the hot washing water is filtered from the paper residue and returned to hot water reservior 26.

Depending upon the type of label used on the containers and the amount of adhesive used, if any, to affix the label to the container the process steps of agitation, filtration and hot water recycling are repeated to remove substantially all of the paper and adhesive from the scrap plastic granules.

In some cases only a single agitation and filtration cycle is needed to remove substantially all of the paper residue from the scrap plastic granules. In other cases multiple agitation and filtration steps would be necessary to remove all the paper residue.

When substantially all of the paper residue has been determined to be removed from the scrap plastic granules, hot water from hot water reservoir 26 is charged into mixing station 22 to overflow mixing station 22 through an overflow weir so that the buoyant plastic granules are washed into dewatering station 28. At dewatering station 28 the plastic granules are deposited on a separator which allows a major portion of the hot wash water to drain from the plastic granules. The plastic granules are then conveyed to drying station 30. At the drying station 30 substantially all of the residual water remaining on the granules received from the dewatering station 28 is removed. The hot wash water from dewatering station 28 is recycled to hot water reservoir 26 for use with the next batch. The hot wash water is not discarded. Recycling the hot wash water lends substantial savings to the current process inasmuch as a number of agitation-filtration-hot water collection steps may be performed with a single charge of hot wash water. The hot wash water need only be replaced when substantial amounts of adhesive have been concentrated in the wash water. No expensive volatile organic solvents are used which militate against the use of expensive pollution control devices.

After the plastic granules are conveyed to drying station 30, they are dried by conventional drying techniques to remove the residual wash water therefrom. The dry plastic granules, now free of substantially all of the paper label and adhesive material, are recycled into resin blending station 10 to be mixed with an appropriate fraction of virgin plastic granules.

Figure 2:
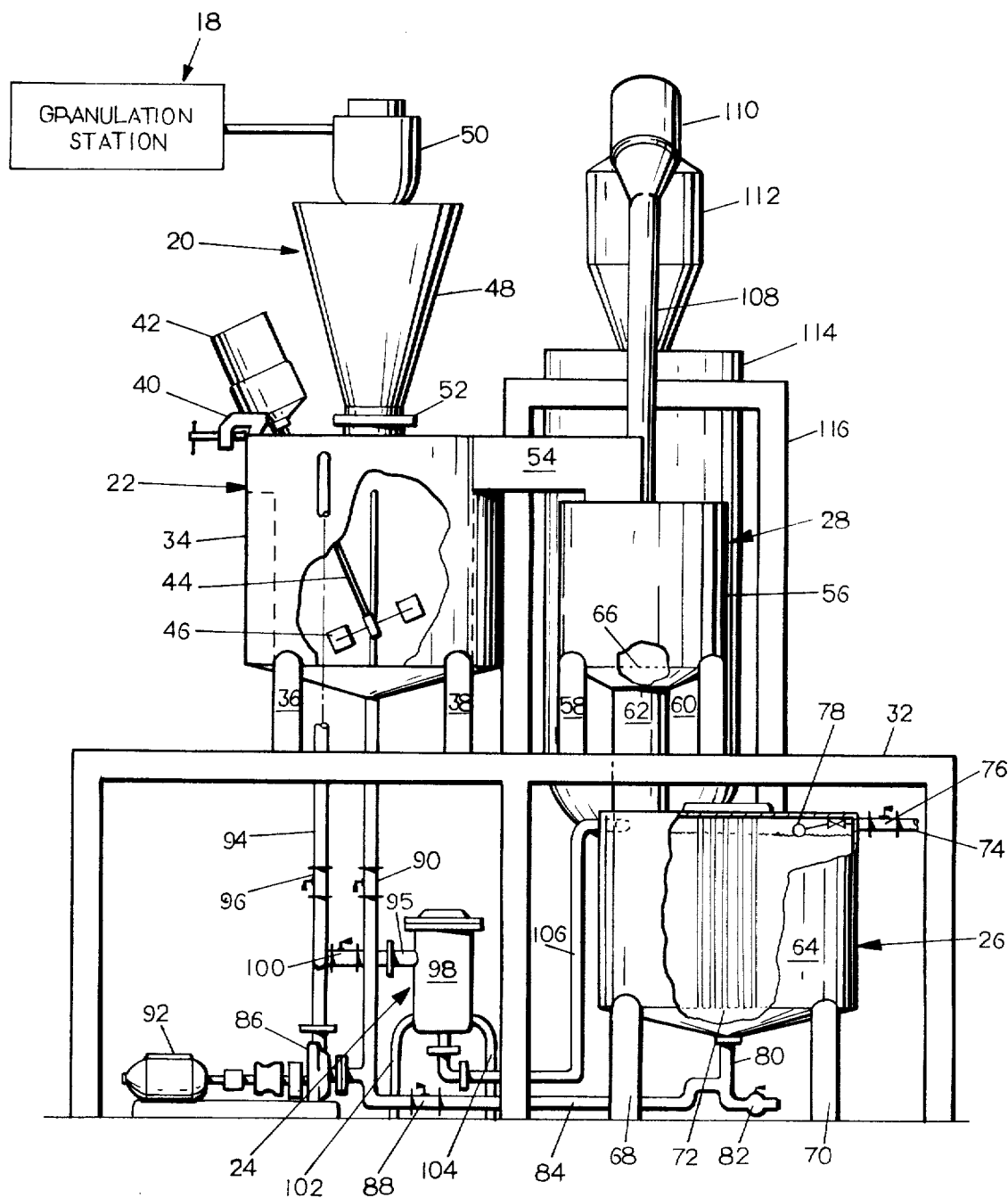
FIG. 2 is a front elevational view of an apparatus for performing the process of the present invention.

The apparatus used in the preferred embodiment, to implement the process of the present invention, is illustrated at FIG. 2 in a front elevational view.

A frame member 32 is used to support the apparatus described hereinafter. A mixing tank 34 is secured to the frame member 32 by a pair of rigid tank support members 36 and 38. A mixer support 40 is attached to the upper rim of the mixing tank 34 and supports a mixer motor 42. A rigid propeller shaft 44 is attached to the drive by a mixer motor 42. The propeller shaft 44 terminates in a tripartate propeller 46 which is disposed near the bottom of the mixing tank 34. Accordingly, the mixing station 22 is comprised of the mixing tank 34, the supports 36 and 38, the support 40, the motor 42, the shaft 44 and propeller 46.

A granule hopper 48 is attached to and supported by the mixing tank 34. Plastic granules are loaded into the granule hopper 48 by a granule transfer means 50, which draws the labeled scrap plastic granules from the granulation station 18, described above. A valve 52 regulates the flow of granules from the hopper 48 into the mixing tank 34. Thus, the granule collection station 20 is comprised of the transfer means 50, the hopper 48 and the valve 52.

An overflow weir 54 is secured near the top rim of the mixing tank 34 and connects to a dewatering tank 56. The dewatering tank 56 is connected to the frame support member 32 by a pair of rigid tank support members 58 and 60, respectively, which are secured to the frame member 32. A drain conduit 62 connects the bottom of the dewatering tank 56 to a hot wash water reservoir 64. A fine mesh screen 66 separates the bottom of dewatering tank 56 from the drain conduit 62 and serves to restrain the passage of plastic granules deposited into the tank 56. The dewatering station 28 includes the tank 56, the supports 58 and 60, the screen 66 and the drain conduit 62.

The reservoir 64 is supported by a pair of rigid reservoir support members 68 and 70, respectively. An immersion heater 72 is disposed within the reservoir 64 and serves to maintain the wash water contained therein at a constant preselected temperature. The reservoir 64 is recharged with hot wash water, as needed, through inlet conduit 74 as controlled by an inlet valve 76. A water level sensor 78 monitors the level of wash water in the reservoir 64 and actuates the inlet valve 76, as needed, to replenish lost wash water. The hot water reservoir 26 is thus comprised of the reservoir 64, the supports 68 and 70, the heater 72, the sensor 78 and the valve 76.

At the bottom of reservoir 64 is a drain conduit 80 terminating in a drain valve 82. A crossover conduit 84 connects the bottom of reservoir 64 via drain conduit 80 to the bottom of mixing tank 34 and to a water pump 86. A valve 88 is disposed in conduit 84 between the bottom of reservoir 64 and the water pump 86. A valve 90 is disposed between the water pump 86 and the bottom of the mixing tank 34. The water pump 86 is driven by a pump drive motor 92.

A filling conduit 94 connects the water pump 86 to the top of the mixing tank 34. A valve 96 is disposed between the water pump 86 and the mixing tank 34 in filling conduit 94.

A filter means 98 is connected to the filling conduit 94 by a crossover conduit 95 through a valve 100, and comprises the filter station 24. The filter 98 is supported by a pair of rigid filter support members 102 and 104, respectively. The bottom of filter means 98 is connected to the top of reservoir 64 by a crossover conduit 106.

A granule conveyor 108 extends into the dewatering tank 56 and terminates near screen 66 to collect plastic granules from the screen 66. The conveyor is driven by a conveyor drive means 110. The conveyor 108 delivers the granules to a chute 112 which is connected to a hot air hopper 114 which is supported by a generally U-shaped hopper support member 116. Thus, the drying station 30 comprises the conveyor 108, the drive means 110, the chute 112, the hopper 114 and support member 116.

Figure 3:
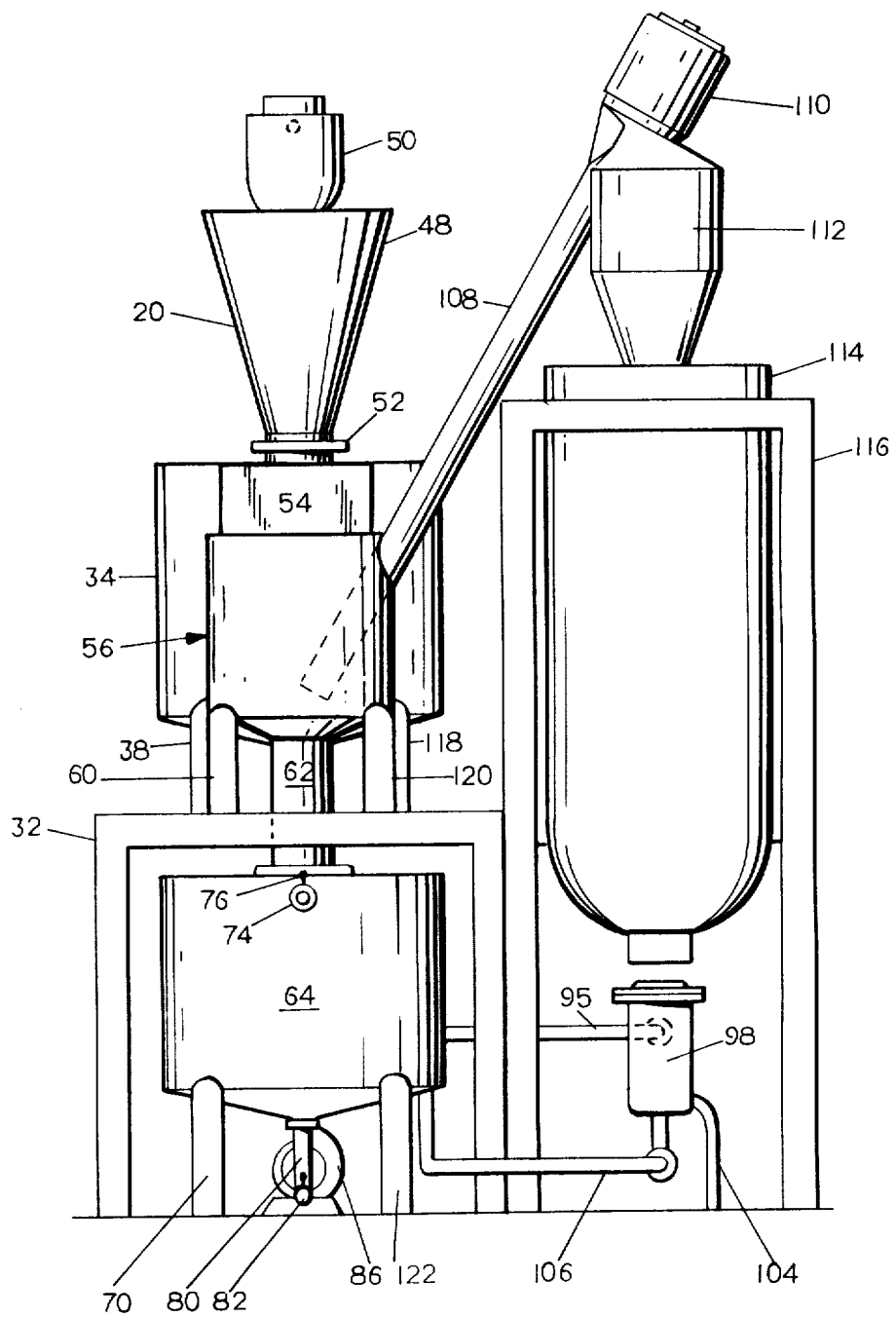
FIG. 3 is a side elevational view of an apparatus for performing the process of the present invention.

FIG. 3 illustrates in a side elevational view the apparatus used to implement the present process and shows in more detail one of a pair of rigid rear tank support members namely member 118 (the second support member is not shown), supporting mixing tank 34. Also shown in FIG. 3 is one of a pair of rigid rear dewatering tank support member 120 (the second support member is not shown). Also shown is one of a pair of rigid rear reservoir support members, namely member 122.

The process according to the present invention is well suited to the recovery of water buoyant plastic from scrap container plastic granules.

Polyethylene containers will be discussed hereinafter, for purposes of example. The process is suited to any water buoyant plastic, such as, polyvinyl chloride, polyethylene terephthalate, polyacrylonitrite and the like.

Typically paper lables which are secured to the polyethylene containers use conventional adhesives to secure the labels to the outer surface of the polyethylene containers. The present process typically operates with hot wash water temperatures of around 180° F. −200° F. which are minimum temperatures used to soften the adhesive, if present. Water temperatures below 180° F. have been found generally too low to effectively loosen the paper from the plastic granules.

Typically, a ratio of about two pounds of scrap plastic granules per gallon of hot wash water is employed. Higher ratios of scrap granules to water could be used but generally require very high speed propeller motion which involves more expensive mixer motors in associated equipment. Also, higher propeller speeds tend to divide the paper label residue too finely to allow settling in a reasonable time period.

Typical polyethylene scrap granules may be successfully separated from the paper label material in about 15 minutes using an 8 inch diameter propeller mixer with three blades. The mixer motor can be one third horsepower or more, usually, an air driven motor is adequate. A propeller speed of about 350 RPM's is used. It has been discovered that when substantially higher RPM ratings are employed, the paper label material may be so finely divided that it will not settle from the solution in a commercially reasonable time to allow draining.

After a 15 minute cycle, a 5 minute settling time is usually allowed so that substantially all the loosened paper can settle to the bottom of the tank. Usually a second washing step is desirable for around 5 minutes agitation time to completely remove any remaining loosely attached paper label material from the plastic granules.

The transfer means 50 which supplies resin to the hopper 48 is preferably a 1,400 pound per hour, 1.3 horsepower rated transfer means to collect plastic granules from granule collection station 20. The hopper 48 is preferably at least 15 cubic feet capacity, approximately 112 gallons equivalent. The mixing tank 34 is preferably a 400 gallon capacity tank with a cylindrical cross section and a conical bottom having approximately a 52 inch diameter and a 46.5 inch sidewall dimension. The mixer motor preferably includes a 48 inch shaft terminating in at least two and preferably three propeller blades which motor is rated at about 1 horsepower. The dewatering tank 56 is preferably about 150 gallons in volume, generally cylindrical in cross section terminating in a conical bottom with a diameter of approximately 38 inches and a sidewall dimension of approximately 35 inches. The conduit 62 is preferably a 6 inch diameter, 1½ inch thick PVC plastic conduit type.

The hot water reservoir 64 typically has a 500 gallon capacity, having a generally cylindrical cross section and a conical bottom typically having a 5 foot diameter and a 3 foot sidewall dimension. The immersion heater 72 is preferably a flanged immersion heater of approximately 60 kilowatt rating with any conventional level sensor and thermostatic means. The immersion heater is in a preferred embodiment, is long enough to conveniently fit within the center of the hot water reservoir 64 and cover substantially all its length.

The water pump 86 and associated pump drive motor 92 are in a preferred embodiment a 100 gallon per minute at 25 psi, 3 horsepower rated system.

The filter means 98 is typically a conventional filter-pressure bag filtration device.

In operation the process of the present invention is typically practiced in the following fashion: Valves 96 and 88 are opened (valves 90 and 100 are closed) and the pump drive motor 92 is engaged. Hot water from reservoir 64 is pumped into the mixing tank 34 through drain conduit 80, crossover conduit 84, through valves 88 and 96 and up filling conduit 94 into the top of mixing tank 34. The filling operation part of the process typically takes 5 minutes or less. After the filling operation is completed, valves 88 and 96 are closed, the pump drive motor 92 is disengaged, and mixer motor 42 is engaged. For approximately 15 minutes granular scrap plastic is fed into the mixing tank 34 from granulation station 18 via the transfer means 50, hopper 48, and open valve 52.

At the end of the loading cycle the transfer means 50 is disengaged to stop loading of the mixing tank 34 and valve 52 is closed. The plastic granules are allowed to mix under the influence of the propeller 46 for approximately 15 minutes. At the end of the 15 minute agitation cycle the mixer motor 42 is disengaged and a 5 minute settling period occurs. At the end of the 5 minute settling period a mix tank drain cycle portion of the process occurs wherein valves 90 and 100 are opened (while valves 88 and 96 remain closed) and pump drive means 92 is engaged. During this period, water is pumped from the bottom of mixing tank 34 through valves 90 and 100 and into and through the filter means 98. The filtered wash water passes through filter means 98, through conduit 106 and into hot water reservoir 64. This process step takes approximately 5 minutes. Subsequently, valves 88 and 96 are reopened and valves 90 and 100 are closed. Then hot wash water for a second mixing cycle is pumped into mixing tank 34. The second mixing cycle takes about 5 minutes to assure complete removal of paper residue from the granules.

After recharging the mixing tank 34, valves 88 and 96 are closed and the pump drive motor 32 is disengaged while the mixer motor 42 is engaged. A five minute secondary agitation or rinse cycle then occurs followed by a five minute settling cycle without agitation.

Next, valves 90 and 100 are opened (while the valves 88 and 96 are closed) and the pump drive motor 92 is started. A five minute draining cycle then occurs after which valves 90 and 100 are closed, the pump drive motor 92, and the mixing tank 34 is flooded to overflowing such that the buoyant cleansed plastic granules overflow the weir 54 and are deposited into the dewatering tank 56 where they are collected on screen 66. The granules are transferred via conveyor 108 into the chute 112 and finally into the hot air hopper 114 where they are completely dried for delivery to the resin blending station 10. Typically an entire batch of polyethylene plastic may be cleaned, using two wash cycles, in about one hour.

The cycling of the process may be hand operated or, if desired, valve actuation, pump and conveyor actuation and other functions may be completely automated by appropriate microprocessor control means.

In the typical operation of the scrap plastic granule purification process disclosed herein approximately 750 pounds of scrap plastic is processed per batch. Typically, 375 gallons of hot wash water in the preferred temperature range of 185°-195° F. is utilized per batch. The hot wash water is continually recycled and need only be replenished as it evaporates or is lost due to the granule drying process.

Other embodiments of the invention will be apparent to those skilled in the art from a consideration of the specification of the invention disclosed herein.

We claim:

1. A process for purifying scrap plastic granules from thermoplastic containers by removing label residue therefrom comprising the steps of:
   (a) charging a mixing tank with a batch of said granules;
   (b) charging said mixing tank with hot water from a hot water reservoir to form a mixture of said hot water and said granules;
   (c) agitating said mixture to separate a first portion of said label residue from said granules;
   (d) removing said hot water and said label residue from said granules;
   (e) filtering said label residue from said hot water;
   (f) returning said hot water to said reservoir;
   (g) repeating steps b-f sufficiently to remove substantially all of said label residue from said granules;
   (h) charging said mixing tank with an amount of said hot water from said reservoir to overflow said granules over an overflow weir into a dewatering tank;
   (i) separating said granules from a major portion of said hot water and returning said hot water to said hot water reservoir; and
   (j) subsequently drying said granules to remove substantially all of said residual water from said granules.

2. The process as defined in claim 1, wherein said hot water is at a temperature of about 180° F. to about 200° F.

3. The process as defined in claim 1, wherein said scrap plastic granules are polyethylene.

4. The process as defined in claim 1, wherein said agitation is mechanical.

5. The process as defined in claim 1, wherein said granules are no larger than about one-half inch in their longest dimension.

6. A batch process for the conversion of defective in-mold labeled thermoplastic containers into recyclable granules comprising the steps of:
   (a) grinding said containers into granules;
   (b) loading said granules into a mixing station;
   (c) loading hot wash water into said mixing station;
   (d) agitating the mixture of hot water and granules to separate substantially all of said label material from said granules;
   (e) separating said hot water and said label material from said granules by removing said hot water and said label material from said mixing station;
   (f) removing said label material from said hot water;
   (g) recycling said hot water into a hot water reservoir;
   (h) loading excess hot water from said reservoir to overflow said mixing station to cause said granules to overflow a weir and deposit in a dewatering station; and
   (i) subsequently removing substantially all of the residual wash water from said granules.

7. The process as defined in claim 6, wherein said hot wash water is at a temperature of about 180° F. to about 200° F.

8. The process as defined in claim 6, wherein said agitating is accomplished by mechanical means.

9. The process as defined in claim 6, wherein said granules are no larger than about one-half inch in their longest dimension.

10. A process for purifying scrap plastic granules from thermoplastic containers by removing paper label residue therefrom comprising the steps of:
    (a) charging a mixing tank with a batch of said granules;
    (b) charging said mixing tank with hot water from a hot water reservoir to form a mixture of said hot water and said granules;
    (c) agitating said mixture to separate a first portion of said paper residue from said granules;
    (d) removing said hot water and said paper residue from said granules;
    (e) filtering said paper residue from said hot water;
    (f) returning said hot water to said reservoir;
    (g) repeating steps b-f sufficiently to remove substantially all of said paper residue from said granules;
    (h) charging said mixing tank with an amount of said hot water from said reservoir to overflow said granules over an overflow weir into a dewatering tank;
    (i) separating said granules from a major portion of said hot water at said dewatering station and returning said hot water to said hot water reservoir;
    (j) charging a drying means with said granules from said dewatering tank; and
    (k) drying said granules to remove substantially all of said residual water on said granules.

11. The process as defined in claim 10, wherein said hot water is at a temperature of about 180° F. to about 200° F.

12. The process as defined in claim 10, wherein said scrap plastic granules are polyethylene.

13. The process as defined in claim 10, wherein said agitation is mechanical.

14. The process as defined in claim 10, wherein said granules are no longer than about one-half inch in their longest dimension.

15. A batch process for the conversion of defective paper labeled polyethylene containers comprising the steps of:
    (a) grinding said containers into granules;
    (b) loading said granules into a mixing station;
    (c) loading hot wash water into said mixing station;
    (d) agitating the mixture of hot water and granules to separate substantially all of said paper label material from said granules;
    (e) separating said hot water and paper label material from said granules by removing said hot water and paper label material from said mixing station;
    (f) removing said paper label material from said hot water;
    (g) recycling said hot water into a hot water reservoir;
    (h) loading excess hot water from said reservoir to overflow said mixing station to cause said granules to overflow a weir and deposit in a dewatering station;
    (i) separating said granules from a major portion of said wash water and returning said wash water to said reservoir;
    (j) charging said granules into a drying means; and
    (k) drying said granules in said drying means to remove substantially all of said wash water from said granules.

* * * * *